(12) United States Patent
Suzuki

(10) Patent No.: US 12,174,501 B2
(45) Date of Patent: Dec. 24, 2024

(54) LIQUID CRYSTAL DISPLAY DEVICE

(71) Applicant: Sharp Display Technology Corporation, Kameyama (JP)

(72) Inventor: Shogo Suzuki, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 7 days.

(21) Appl. No.: 18/123,194

(22) Filed: Mar. 17, 2023

(65) Prior Publication Data

US 2023/0305347 A1    Sep. 28, 2023

(30) Foreign Application Priority Data

Mar. 24, 2022   (JP) .................. 2022-049156

(51) Int. Cl.
*G02F 1/1362* (2006.01)
*G02F 1/1343* (2006.01)
*G02F 1/1345* (2006.01)

(52) U.S. Cl.
CPC .. *G02F 1/136286* (2013.01); *G02F 1/134309* (2013.01); *G02F 1/13439* (2013.01); *G02F 1/13454* (2013.01); *G02F 2203/01* (2013.01); *G02F 2203/64* (2013.01); *G02F 2203/66* (2013.01)

(58) Field of Classification Search
None
See application file for complete search history.

(56) References Cited

U.S. PATENT DOCUMENTS

| | | | | |
|---|---|---|---|---|
| 11,640,089 B2* | 5/2023 | Suzuki | ............. | G02F 1/1362 349/39 |
| 2015/0293546 A1 | 10/2015 | Tanaka et al. | | |
| 2016/0019856 A1* | 1/2016 | Tanaka | ............. | G02F 1/1345 345/87 |
| 2018/0231837 A1 | 8/2018 | Fukuoka et al. | | |

FOREIGN PATENT DOCUMENTS

| | | |
|---|---|---|
| JP | H11-305681 A | 11/1999 |
| JP | 2009-103866 A | 5/2009 |
| WO | 2014-069529 A1 | 5/2014 |
| WO | 2014-142183 A1 | 9/2014 |
| WO | 2016-056298 A1 | 4/2016 |

* cited by examiner

*Primary Examiner* — Dung T Nguyen
(74) *Attorney, Agent, or Firm* — ScienBiziP, P.C.

(57) ABSTRACT

A liquid crystal display device includes a display area having a plurality of first areas and a plurality of second areas arranged in a matrix in a row direction and a column direction, a plurality of first TFTs each located in one of the plurality of first areas, a plurality of pixel electrodes each located in one of the plurality of first areas, a plurality of transparent electrodes each located in one of the plurality of second areas, a plurality of gate bus lines extending in the row direction and being connected to the plurality of first TFTs, a plurality of source bus lines extending in the column direction and being connected to the plurality of first TFTs, and a plurality of dummy source bus lines each extending in the column direction and being connected to one of the plurality of gate bus lines.

9 Claims, 13 Drawing Sheets

LIQUID CRYSTAL DISPLAY DEVICE

BACKGROUND

1. Field

The present disclosure relates to a liquid crystal display device.

2. Description of the Related Art

A display device called a see-through display or a transparent display has been studied, in which an image based on an input signal can be displayed while allowing the background behind the display device to remain visible (refer to, for example, International Publication No. 2016/056298).

For such a display device, it may be desired to reduce the frame area to gain more freedom in designing the external appearance. For example, when a see-through display is disposed in front of a shop window and if the frame area is small, it is difficult for an observer to recognize that the display device is disposed in front, so that the display effect of the see-through display is enhanced.

Accordingly, the present disclosure provides a liquid crystal display device that allows the background behind the display device to easily remain visible and gives more freedom in designing the external appearance of the display device.

SUMMARY

According to an embodiment of the present disclosure, a liquid crystal display device includes a first substrate, a second substrate disposed facing the first substrate, a liquid crystal layer located between the first substrate and the second substrate, wherein a display area is formed so as to be located in an area in which the first substrate, the second substrate, and the liquid crystal layer are stacked and wherein the display area includes a plurality of first areas and a plurality of second areas arranged in a matrix in a row direction and a column direction, a plurality of first TFTs each located in one of the plurality of first areas of the first substrate, a plurality of pixel electrodes each located in one of the plurality of first areas of the first substrate and connected to one of the plurality of first TFTs, a plurality of transparent electrodes each located in one of the plurality of second areas of the first substrate, a counter electrode located on one of the first substrate and the second substrate so as to face the plurality of pixel electrodes and the plurality of transparent electrodes, a plurality of gate bus lines located on the first substrate, wherein the gate bus lines extend in the row direction and are connected to the plurality of first TFTs, a plurality of source bus lines located on the first substrate, wherein the source bus lines extend in the column direction and are connected to the plurality of first TFTs, and a plurality of dummy source bus lines located on the first substrate, wherein each of the dummy source bus lines extends in the column direction and is connected to one of the plurality of gate bus lines.

According to another embodiment of the present disclosure, a liquid crystal display device includes a first substrate having a principal surface, a second substrate disposed facing the principal surface of the first substrate, a liquid crystal layer provided between the first substrate and the second substrate, wherein a display area is formed so as to be located in an area in which the first substrate, the second substrate, and the liquid crystal layer are stacked and wherein the display area includes a plurality of first areas and a plurality of second areas arranged in a matrix in a row direction and a column direction, a plurality of first TFTs each located in one of the plurality of first areas of the first substrate, a plurality of pixel electrodes each located in one of the plurality of first areas of the first substrate and connected to one of the plurality of first TFTs, a plurality of transparent electrodes each located in one of the plurality of second areas of the first substrate, a counter electrode located on the first substrate or the second substrate so as to face the plurality of pixel electrodes and the plurality of transparent electrodes, a plurality of gate bus lines located on the first substrate, wherein the gate bus lines extend in the row direction and are connected to the plurality of first TFTs, a plurality of source bus lines located on the first substrate, wherein the source bus lines extend in the column direction and are connected to the plurality of first TFTs, a plurality of dummy source bus lines located on the first substrate, wherein the dummy source bus lines extend in the column direction, and a gate driver connected to the plurality of gate bus lines, wherein the gate driver includes a plurality of second TFTs. The plurality of second TFTs are located in the second areas of the first substrate and are connected to at least a subset of the dummy source bus lines.

DESCRIPTION OF THE EMBODIMENTS

Figure 1:
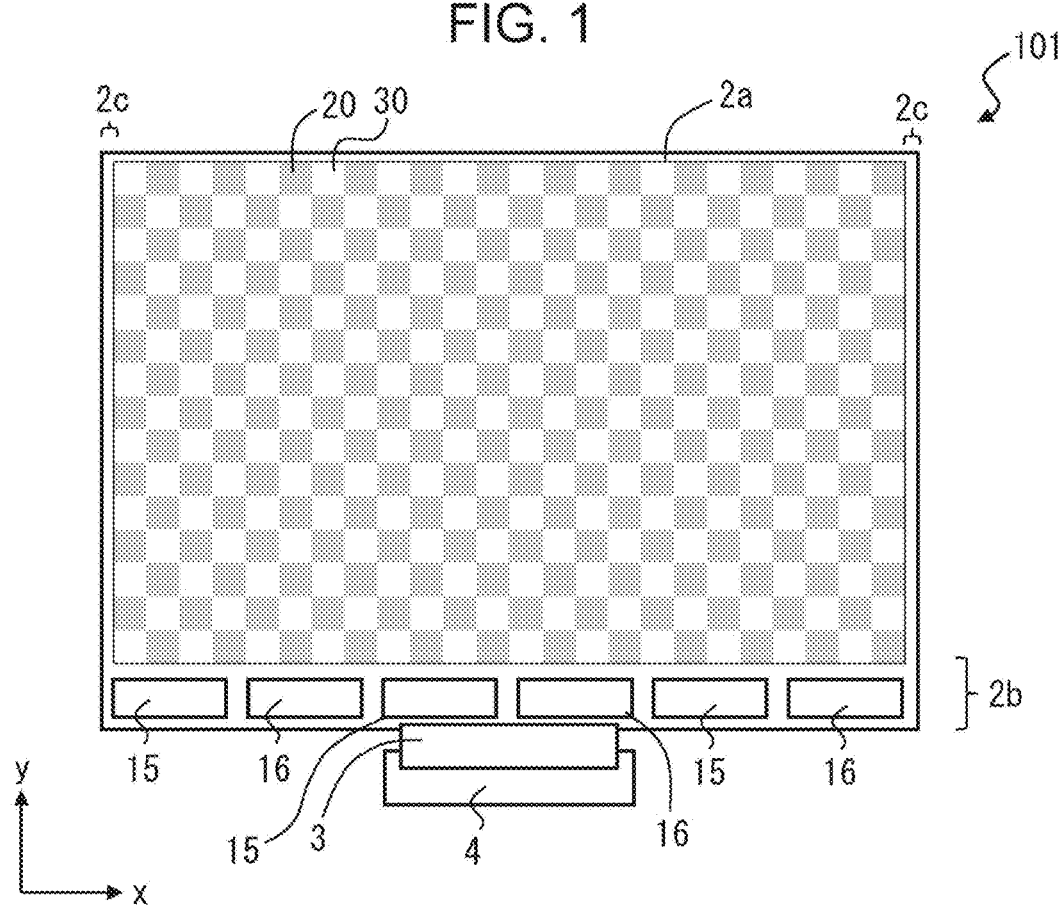
FIG. 1 is a schematic illustration of an example of a planar structure of a liquid crystal display device according to a first embodiment.

Exemplary embodiments of the present disclosure are described below with reference to the accompanying drawings. The present disclosure is not limited to the embodiments described below, and design changes can be made as appropriate within the scope of satisfying the configuration of the present disclosure. Furthermore, in the following description, the same reference numerals in different drawings identify the same elements or elements having similar functions. In this case, description of the element may not be repeated. In addition, the configurations described in the embodiment and modification may be appropriately combined or changed without departing from the scope of the present disclosure. For ease of understanding, in the drawings referred to below, the configuration may be illustrated in a simplified or schematic form, or some constituent members may be omitted. Still furthermore, the dimensional ratios between the constituent members illustrated in the drawings do not necessarily indicate the actual dimensional ratios. The term "row direction" refers to the horizontal direction (the x direction) of the screen of the display device, and the term "column direction" refers to the vertical direction (the y direction) of the screen of the display device.

First Embodiment

Figure 2:
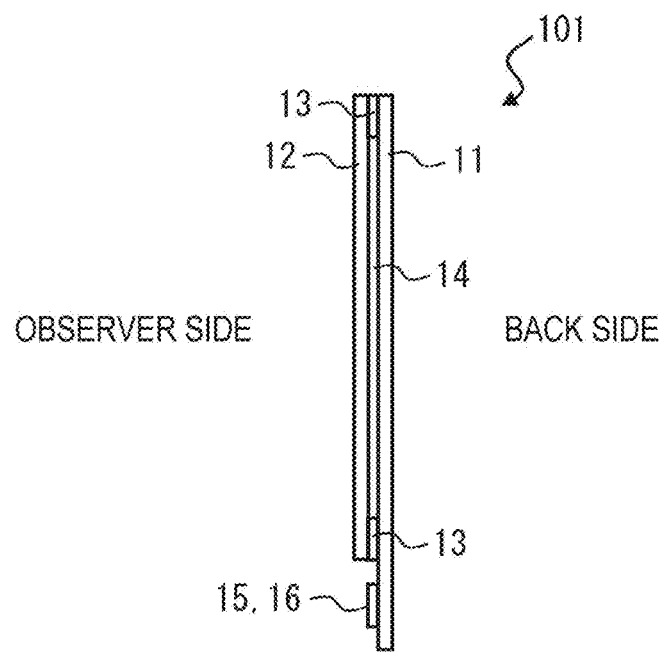
FIG. 2 is a schematic cross-sectional view of the structure of the liquid crystal display device illustrated in FIG. 1.

FIG. 1 is a schematic plan view of the configuration of a liquid crystal display device 101 according to the present embodiment. FIG. 2 is a schematic cross-sectional view of the structure of the liquid crystal display device 101 according to the first embodiment. As illustrated in FIG. 1, the liquid crystal display device 101 according to the present embodiment is a see-through display that allows an observer to view the background, a specific object, another display device, and the like behind the liquid crystal display device 101. The liquid crystal display device 101 includes an active matrix substrate 11 having a plurality of TFTs (Thin Film Transistors) serving as switching elements, a counter substrate 12 disposed facing the active matrix substrate 11, and a liquid crystal layer 14 located between the active matrix substrate 11 and the counter substrate 12. The active matrix substrate 11 and the counter substrate 12 are bonded to each other with a predetermined gap therebetween formed by a seal 13, and the liquid crystal layer 14 is disposed between the active matrix substrate 11 and the counter substrate 12 and in a region surrounded by the seal 13.

The liquid crystal display device 101 has a display area 2a in which an image is displayed in an area where the active matrix substrate 11, the liquid crystal layer 14, and the counter substrate 12 are stacked. The display area 2a includes a plurality of first areas 20 and a plurality of second areas 30 arranged in a matrix in the row direction (the x direction) and column direction (the y direction). For ease of understanding, the first areas 20 are denoted by gray squares in FIG. 1 and the subsequent figures. The second areas 30 are arranged at such positions that they do not overlap the first areas 20. According to the present embodiment, the first areas 20 and the second areas 30 are alternately arranged in the row direction and the column direction so that, in the display area 2a, the first areas 20 and the second areas 30 are arranged in a checkered pattern. The first areas 20 and the second areas 30 may or may not be arranged alternately as described above. For example, the first areas 20 and the second areas 30 may be alternately arranged every three or more pixels. One of a pair of linear polarization plates is positioned on the observer side of the active matrix substrate 11, and the other is positioned on the back side of the counter substrate 12.

The liquid crystal display device 101 includes pixels located in the first area 20 to display an image. That is, by arranging pixel TFTs and individually controlling the pixel potentials, an image based on an input image signal is displayed in the first areas 20. In contrast, the second areas 30 do not contribute to image display and allow light to pass therethrough from the back side to the observer side. That is, since the pixel TFTs are not arranged, the pixel potentials are not individually controlled, and a certain voltage is applied to make the liquid crystal layer 14 translucent. In this way, the second areas 30 maintain a high transmittance regardless of the input image signal and transmits light, such as light from the background on the back side of the liquid crystal display device 101. As a result, the liquid crystal display device 101 functions as a see-through display that enables the background on the back side to be easily and clearly visible.

The active matrix substrate 11 has a non-display area 2b at least partially around the display area 2a. According to the present embodiment, the non-display area 2b is located underneath the display area 2a. The non-display area 2b may be located on top of the display area 2a.

As described in more detail below, the liquid crystal display device 101 includes a source driver 15 and a gate driver 16 located in the non-display area 2b of the active matrix substrate 11. It is desirable that the source driver 15 and the gate driver 16 be monolithically formed on active matrix substrate 11. Since the gate driver 16 is not positioned adjacent to the display area 2a in the row direction and is positioned adjacent to the display area 2a in the column direction, a non-display area 2c of the liquid crystal display device 101 in the horizontal direction can be reduced and, thus, the freedom in designing the external appearance can be increased. For example, the liquid crystal display device according to the present embodiment is suitably used as a free form display.

The liquid crystal display device 101 further includes a control circuit 4 for inputting a variety of signals to the source driver 15 and the gate driver 16. The source driver 15 and the gate driver 16 are connected to the control circuit 4 by a flexible printed circuit board (FPC) 3.

Figure 3:
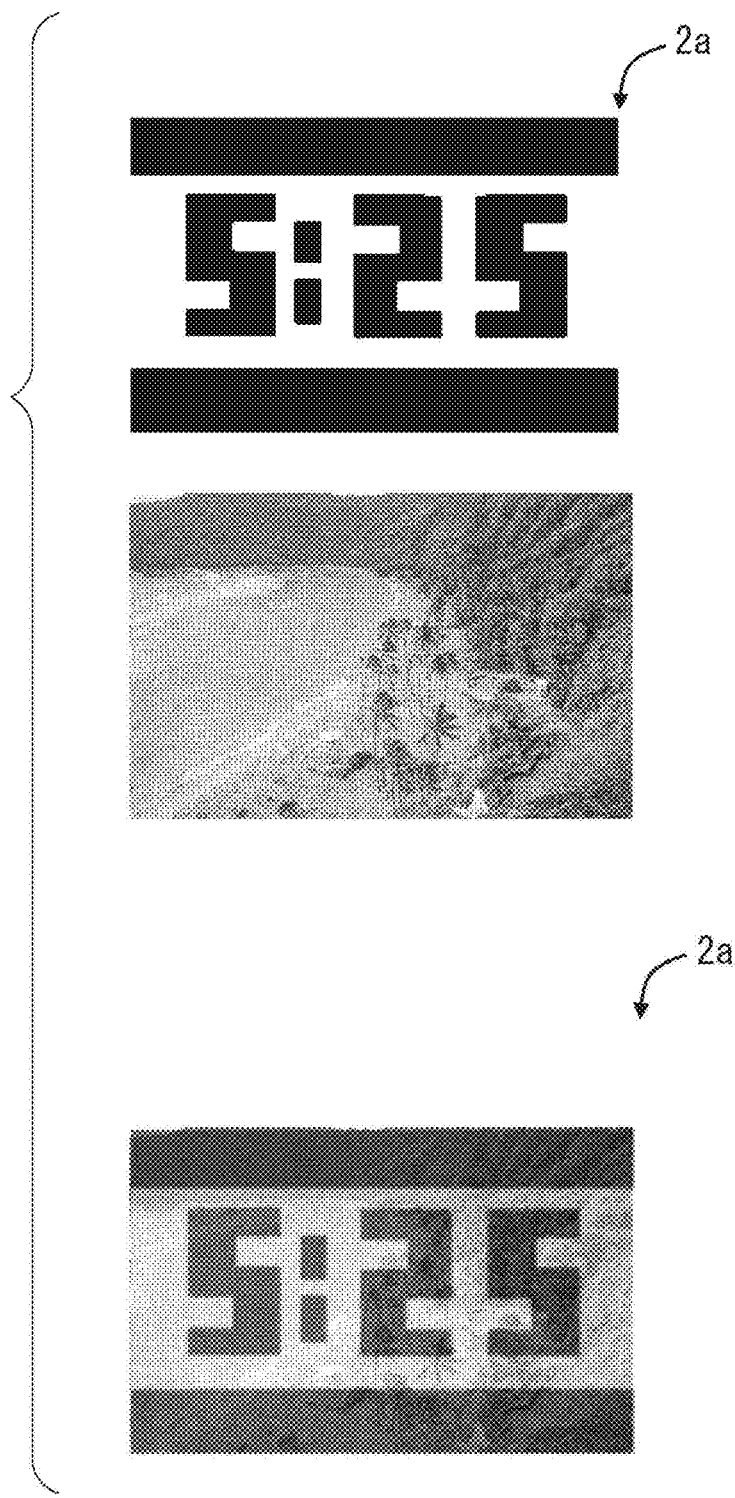
FIG. 3 is a schematic illustration of an example of how an image on the liquid crystal display device illustrated in FIG. 1 and the image of the back area behind the liquid crystal display device look.

FIG. 3 is a schematic illustration of an example of how an image on the liquid crystal display device 101 and the image of the back area behind the liquid crystal display device 101 look. As illustrated in FIG. 3, the display area 2a of the liquid crystal display device 101 can display a desired still image or moving image illustrated in the upper part of FIG. 3. When the scenery in the center part of FIG. 3 can be seen behind the liquid crystal display device 101, the background can be observed through the desired image, as illustrated in the lower part of FIG. 3. The scenery seen behind the liquid crystal display device 101 may be a still image or a moving image displayed by another display device, such as a liquid crystal display device or an organic electroluminescence (EL) device.

Note that in the example illustrated in FIGS. 1 and 2, the liquid crystal display device 101 does not include a backlight and a color filters. However, the liquid crystal display device according to the present embodiment may include, on the back side thereof, a highly translucent light guide plate and an edge light capable of emitting red, green, and blue light in a time division manner to display a full color image in a field sequential manner. Alternatively, a liquid crystal display device capable of full-color display may be achieved by, for example, regarding three first areas 20 capable of displaying an image as a set and placing, for example, red, green, and blue color filters on the set.

In the example illustrated in FIGS. 1 and 2, the first areas 20 and the second areas 30 are arranged alternately (in a staggered pattern) over the entire display area 2a, so that the entire display area 2a of the liquid crystal display device makes a see-through area. However, part of the display area 2a may be a non-see-through area. In this case, the second areas 30 are not disposed in the non-see-through area of the display area 2a, and only the first areas 20 are disposed.

Figure 4:
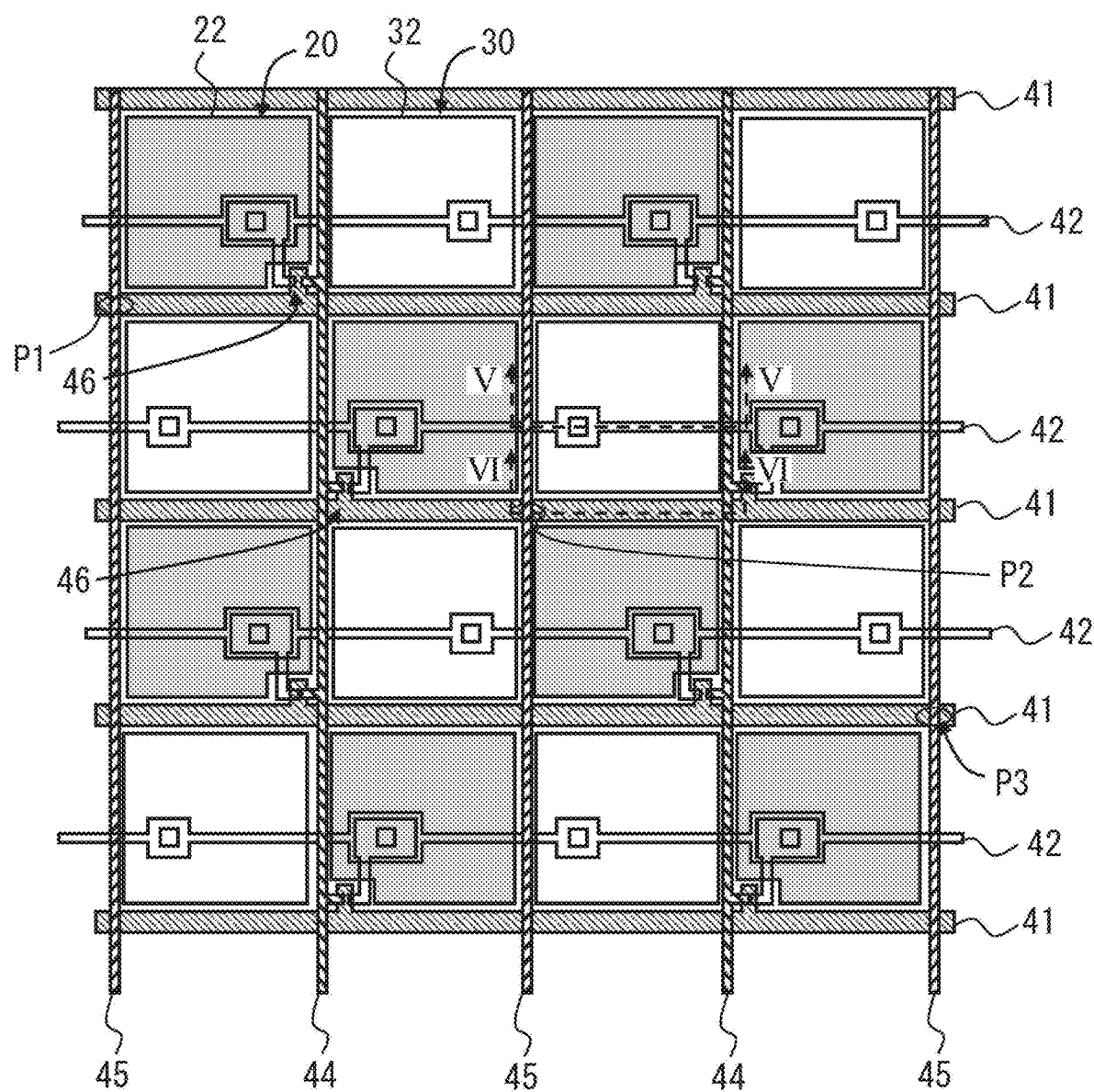
FIG. 4 is an enlarged schematic plan view of the configuration of a display area of the liquid crystal display device illustrated in FIG. 1.
Figure 5:
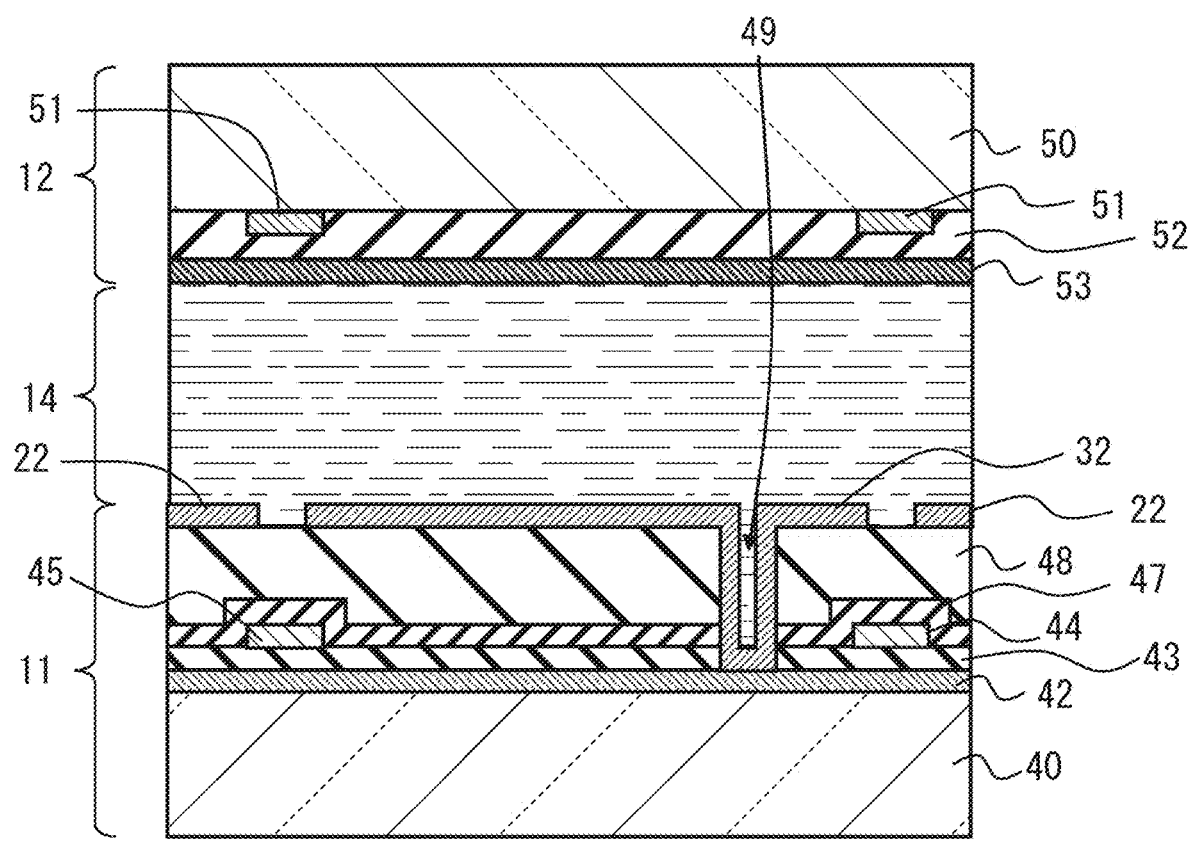
FIG. 5 is a schematic cross-sectional view of the liquid crystal display device taken along line V-V of FIG. 4.
Figure 6:
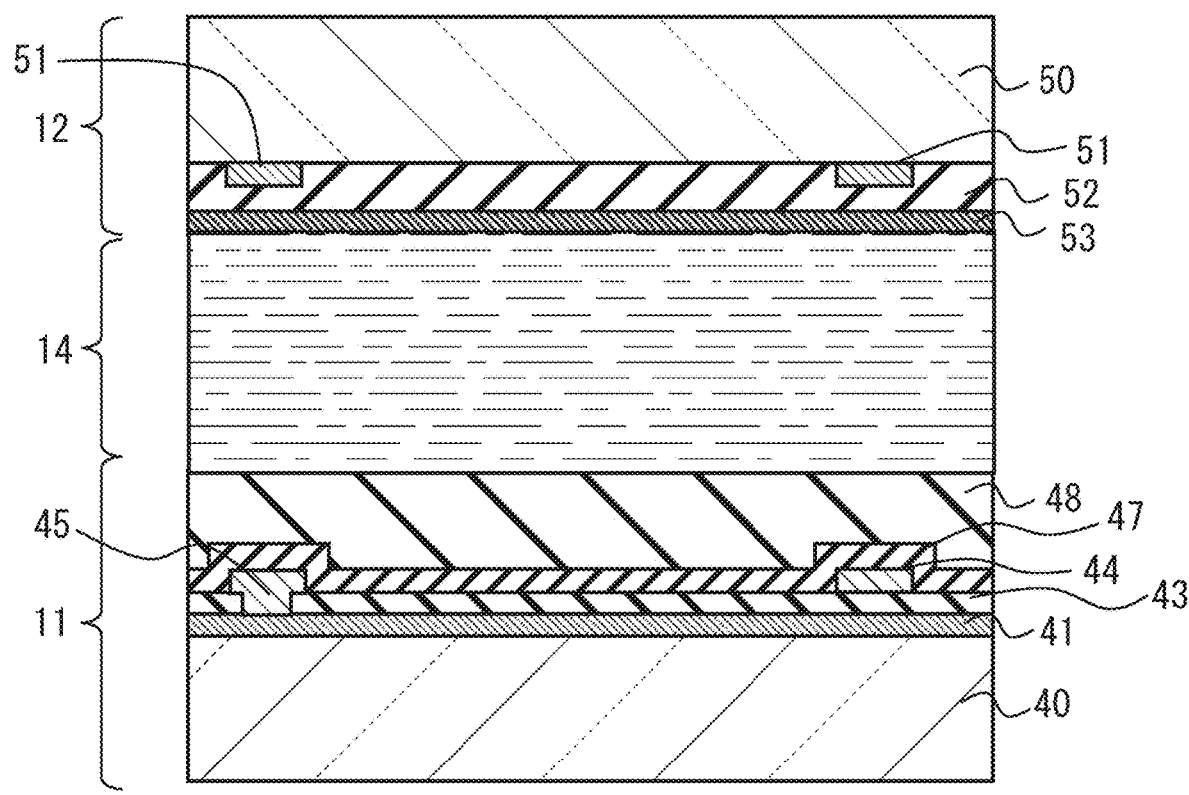
FIG. 6 is a schematic cross-sectional view of the liquid crystal display device taken along line VI-VI of FIG. 4.

FIG. 4 is an enlarged schematic plan view of the configuration of the display area 2a of the liquid crystal display device 101. FIG. 5 is a schematic cross-sectional view of the liquid crystal display device 101 taken along line V-V of FIG. 4. FIG. 6 is a schematic cross-sectional view of the liquid crystal display device 101 taken along line VI-VI of FIG. 4.

In the display area 2a, the active matrix substrate 11 includes a plurality of gate bus lines 41 and a plurality of auxiliary capacitance lines 42 (Cs signal lines) extending parallel to one another in the row direction on a transparent first substrate 40, such as a glass substrate, and a plurality of source bus lines 44 and a plurality of dummy source bus lines 45 extending parallel to one another in a direction (the column direction) crossing each of the gate bus lines 41 and each of the auxiliary capacitance lines 42 via a gate insulating film 43.

According to the present embodiment, the gate bus lines 41 and the auxiliary capacitance lines 42 are arranged alternately one by one in the column direction, and the source bus lines 44 and the dummy source bus lines 45 are arranged alternately one by one in the row direction. The plurality of gate bus lines 41 and the plurality of source bus lines 44 and dummy source bus lines 45 are arranged in a grid pattern as a whole so as to partition the display area 2a into rectangles. The first areas 20 and the second areas 30 are positioned in regions partitioned by these wire lines so as to form a checkered pattern. The first areas 20 and the second areas 30 are also referred to as "pixels" for descriptive purposes. Each of the gate bus lines 41 is disposed between two adjacent pixels in the column direction, and each of the source bus lines 44 and the dummy source bus lines 45 is disposed between two adjacent pixels in the row direction.

The gate bus lines 41 and the auxiliary capacitance lines 42 are arranged at the same pitch as the pixel pitch in the column direction. However, the source bus lines 44 (and the dummy source bus lines 45) are arranged at twice the pixel pitch in the row direction. In each of the first areas 20, a first TFT 46 is disposed near the intersection of each of the gate bus lines 41 and each of the source bus lines 44 and is connected to the gate bus line 41 and the source bus line 44. A gradation signal is supplied to the source bus line 44.

The dummy source bus lines 45 are wire lines extending parallel to and in the same layer as the source bus lines 44 in the display area 2a. According to the present embodiment, each of the dummy source bus lines 45 is connected to one of the gate bus lines 41. In the example illustrated in FIG. 4, the dummy source bus lines 45 and the gate bus lines 41 are connected at positions P1, P2, and P3.

A scan signal input to the gate bus line 41 is supplied to the dummy source bus line 45. Therefore, it is desirable that in the liquid crystal display device 101, the total number of dummy source bus lines 45 be greater than or equal to the total number of gate bus lines 41. When the gate bus line 41 and one of the source bus line 44 and the dummy source bus line 45 are disposed between every two adjacent pixels, this condition can be satisfied by adjusting the number of pixels in the row direction and the column direction. For example, let x be the total number of the arranged first areas 20 and second areas 30 (the number of pixels) in the row direction, and let y be that in the column direction, then the above condition can be satisfied if $x \geq 2y$.

The active matrix substrate 11 further includes a plurality of pixel electrodes 22 and a plurality of transparent electrodes 32 on an inorganic insulating film 47 and an organic insulating film (a planarization film) 48 that cover the source bus lines 44 and the dummy source bus lines 45. The pixel electrodes 22 and the transparent electrodes 32 are disposed in the first areas 20 and the second areas 30, respectively. Each of the pixel electrodes 22 is connected to the corresponding gate bus line 41 and source bus line 44 via the TFT 46, and a gradation signal is supplied from the source bus line 44 to the pixel electrode 22 via the TFT 46. The plurality of transparent electrodes 32 are connected to the auxiliary capacitance lines 42, and the signals of the same certain voltage are supplied to the transparent electrodes 32. In the example illustrated in FIG. 4, the transparent electrodes 32 are disposed in the respective second areas 30 so as to be separated from each other. However, the transparent electrodes 32 located in the respective second areas 30 may be connected to each other.

The gate bus lines 41, the source bus lines 44 and the dummy source bus lines 45 are metal wire lines made of a metal material, and the source bus lines 44 and the dummy source bus lines 45 can be formed at the same time by patterning a common metal film in a photolithography process. The auxiliary capacitance lines 42 may be metal wire lines made of a metal material or may be transparent electrodes made of a transparent conductive material, such as ITO (indium tin oxide). In the former case, the gate bus lines 41 and the auxiliary capacitance lines 42 can be formed at the same time by patterning a common metal film in a photolithography process.

The pixel electrodes 22 and the transparent electrodes 32 are transparent electrodes made of a transparent conductive material, such as ITO, and can be formed at the same time by patterning a common transparent conductive film in a photolithography process.

The counter substrate 12 includes a black matrix (BM) 51 and a colorless and transparent organic insulating film (a planarization film) 52 provided on a transparent substrate 50 which is a second substrate, such as a glass substrate, and a counter electrode 53 provided on the organic insulating film 52.

The counter electrode 53 is a transparent electrode made of a transparent conductive material, such as ITO, and is uniformly disposed over the entire display area 2a. A COM signal that is a signal common to the first areas 20 and the second areas 30 is supplied to the counter electrode 53. The counter electrode 53 may be provided on the active matrix substrate 11. In this case, the counter electrode 53 may be provided in the same layer as the pixel electrode 22 and the transparent electrode 32 or may be provided on the side of the pixel electrodes 22 and the transparent electrodes 32 adjacent to the liquid crystal layer 14 or on the opposite side via an insulating film.

An alignment film for controlling the alignment of liquid crystal molecules contained in the liquid crystal layer 14 is provided on the surface of each of the active matrix substrate 11 and the counter substrate 12 adjacent to the liquid crystal layer 14. A polarization plate, for example, a linear polarization plate is attached to the surface of each of the active matrix substrate 11 and the counter substrate 12 remote from the liquid crystal layer 14.

The liquid crystal display device 101 may be driven in a normally black mode or may be driven in a normally white mode. In applications where the view is hidden behind the liquid crystal display device 101 for a time period except for a particular time period, such as when the liquid crystal display device 101 functions as a curtain, blind, or the like, it is desirable that the liquid crystal display device 101 be driven in a normally black mode. In contrast, when the liquid crystal display device 101 is used such that the background is visible at all times, it is desirable that the liquid crystal display device 101 be driven in a normally white mode. In the normally white mode, the transmittance is the highest when no voltage is applied to the liquid crystal layer 14 (a white display state), and the transmittance decreases as a voltage is applied to the liquid crystal layer 14. In a normally black mode, the transmittance is the lowest (a black display state) when no voltage is applied to the liquid crystal layer 14, and the transmittance increases as a voltage is applied to the liquid crystal layer 14.

A method for driving the liquid crystal layer 14 in the liquid crystal display device 101 is not limited to a particular type of method and may be, for example, a TN (Twisted Nematic) type, an ECB (Electrically Controlled Birefringence) type, an FFS (Fringe-Field Switching) type, and a VA (Vertical Alignment) type. In terms of power consumption, the TN type and ECB type are suitable for the normally white mode, and the VA type, FFS type, and ECB type are suitable for the normally black mode. In addition, it is desirable to select a driving method in accordance with the operating time, for example, in accordance with whether the liquid crystal display device 101 is mounted in a vehicle window and is used all the time or mounted in a game machine and is used only for a specific time period.

In the liquid crystal display device 101, the gate driver 16 sequentially supplies scan signals to the gate bus line 41 via the dummy source bus line 45 under the control performed by the control circuit 4, and the source driver 15 supplies a gradation signal to the source bus line 44 at the time the first TFT 46 enters a voltage application state (an ON state) due to the scan signal. The pixel electrode 22 is set to an electric potential corresponding to the gradation signal supplied from the source driver 15 via the connected first TFT 46 and source bus line 44 and, thus, an electric field (a longitudinal electric field when the counter electrode 53 is provided on the counter substrate 12) is generated between the pixel electrode 22 and the counter electrode 53, and the liquid crystal molecules of the liquid crystal layer 14 rotate. In this manner, the magnitude of the voltage applied between the pixel electrode 22 and the counter electrode 53 is controlled to change the retardation of the liquid crystal layer 14 and control transmission or non-transmission of light. The gradation signal supplied to the TFT 46 in the first area 20 is accumulated in the liquid crystal capacitor composed of the pixel electrode 22, the liquid crystal layer 14, and the counter electrode 53 until the next frame. In addition, the gradation signal is accumulated in an auxiliary capacitor composed of the drain electrode of the first TFT 46, the gate insulating film 43, and the auxiliary capacitance line 42.

In contrast, the first TFT 46 and other TFTs for switching the transparent electrode 32 are not disposed in the second area 30. In the second area 30, the transparent electrode 32 and the auxiliary capacitance line 42 are connected to each other via a contact hole 49 passing through the gate insulating film 43, the inorganic insulating film 47, and the organic insulating film 48. In the normally white mode, a signal (a COM signal) having substantially the same potential as that of the counter electrode 53 is supplied to the auxiliary capacitance line 42. In addition, the area occupied by the auxiliary capacitance line 42 in the second area 30 corresponds to the contact hole 49 portion and the minimum line width and is smaller than the area occupied by the auxiliary capacitance line 42 in the first area 20.

As described above, the second areas 30 each having no TFTs, a high aperture ratio (a high transmittance), and a small area occupied by the auxiliary capacitance line 42 are arranged alternately (in a staggered manner) with respect to the first areas 20. Therefore, objects and scenery behind the liquid crystal display device 101 can be easily viewed. In addition, since the alignment state of the liquid crystal layer 14 is not changed in the second area 30, a decrease in the transmittance related to the response speed of the liquid crystal can be reduced.

A signal supplied to the auxiliary capacitance line 42 is input from, for example, an external power source in the form of a DC signal. In this case, it is desirable that the signal supplied to the auxiliary capacitance line 42 be set to a fixed potential that provides a no-voltage applied state in which the second area 30 is white in a normally white mode and is black in a normally black mode. Furthermore, as described above, it is desirable to supply a signal (a COM signal) having substantially the same potential as that of the counter electrode 53 to the auxiliary capacitance line 42. In this case, each of the auxiliary capacitance lines 42 may be connected to a terminal portion provided in the uppermost layer of the active matrix substrate 11, and the terminal portion may be connected to the counter electrode 53 of the counter substrate 12 via a conductive member, such as gold particles, mixed in the seal 13. Thus, a COM signal may be supplied from an external power supply to the auxiliary capacitance line 42 and the counter electrode 53.

Figure 7:
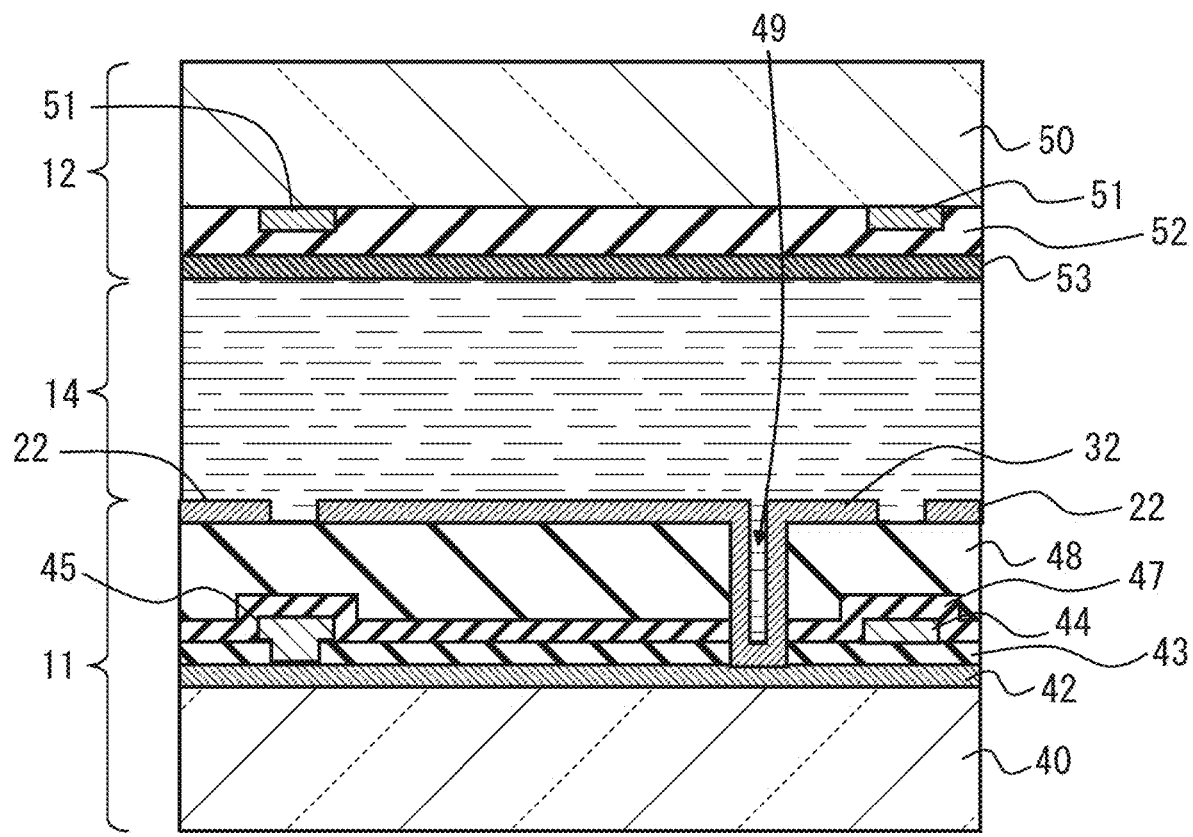
FIG. 7 is a schematic cross-sectional view of another configuration example of the liquid crystal display device illustrated in FIG. 1.

Alternatively, as illustrated in FIG. 7, the auxiliary capacitance line 42 may be connected to the dummy source bus line 45 that is not connected to the gate bus line 41 to supply a DC signal to the auxiliary capacitance line 42. In this case, it is desirable that the total number of the dummy source bus lines 45 be greater than the total number of the gate bus lines 41 in the liquid crystal display device 101. For example, let x be the total number of the arranged first areas 20 and second areas 30 in the row direction, and let y be that in the column direction, then the above condition can be satisfied if x>2y. This allows the dummy source bus line 45 connected to the auxiliary capacitance line 42 to also function as an auxiliary capacitance line. For this reason, by reducing the width of the auxiliary capacitance line 42, the aperture ratio of the first area 20 and the second area 30 can be increased.

In addition, according to the present embodiment, the first areas 20 are alternately positioned with respect to the second areas 30, and among the first TFTs 46, the first TFT 46 corresponding to two adjacent columns of the first areas 20 is connected to one source bus line 44 (the source bus line 44 sandwiched by the two columns of the first areas 20). For this reason, there is a portion where the source bus line 44 is not disposed in the gap between two adjacent columns of the first areas 20. One of the dummy source bus lines 45 is disposed in the region where the source bus line 44 is not disposed, and the dummy source bus line 45 is connected to the gate bus line 41. That is, the dummy source bus line 45 functions as a wire line for leading out the gate bus line 41 in the column direction. As a result, a non-display area where existing liquid crystal display devices place gate drivers or lead-out wires disposed at either side of a gate bus line can be reduced or substantially removed. As a result, a so-called frame area of the liquid crystal display device can be reduced and, thus, the freedom in designing the external appearance can be increased. For example, the liquid crystal display device according to the present embodiment can be suitably used for a free form display or the like.

Second Embodiment

Figure 8:
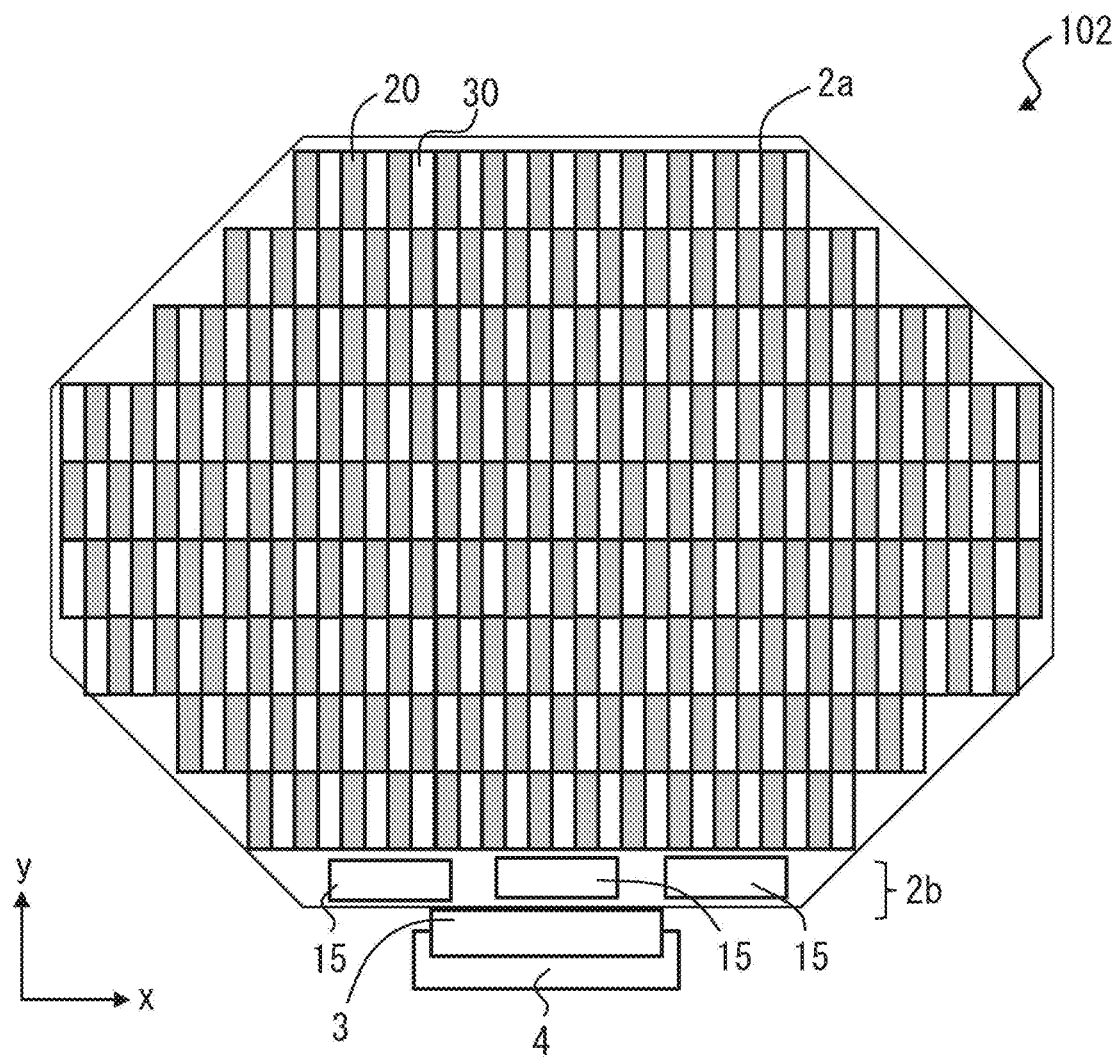
FIG. 8 is a schematic illustration of an example of the planar structure of a liquid crystal display device according to a second embodiment.

FIG. 8 is a schematic plan view of the configuration of a liquid crystal display device 102 according to the present embodiment. Unlike the first embodiment, the liquid crystal display device 102 according to the present embodiment includes a gate driver disposed in the display area 2a. The source drivers 15 are disposed in the non-display area 2b, and no gate driver is disposed in the non-display area 2b. A liquid crystal display device in which the gate drivers are disposed in the display area 2a is described in, for example, U.S. Pat. No. 9,685,131 and its corresponding Japanese Patent No. 6230074. The entire contents of Japanese Patent No. 6230074 and U.S. Pat. No. 9,685,131 are hereby incorporated by reference.

Figure 9:
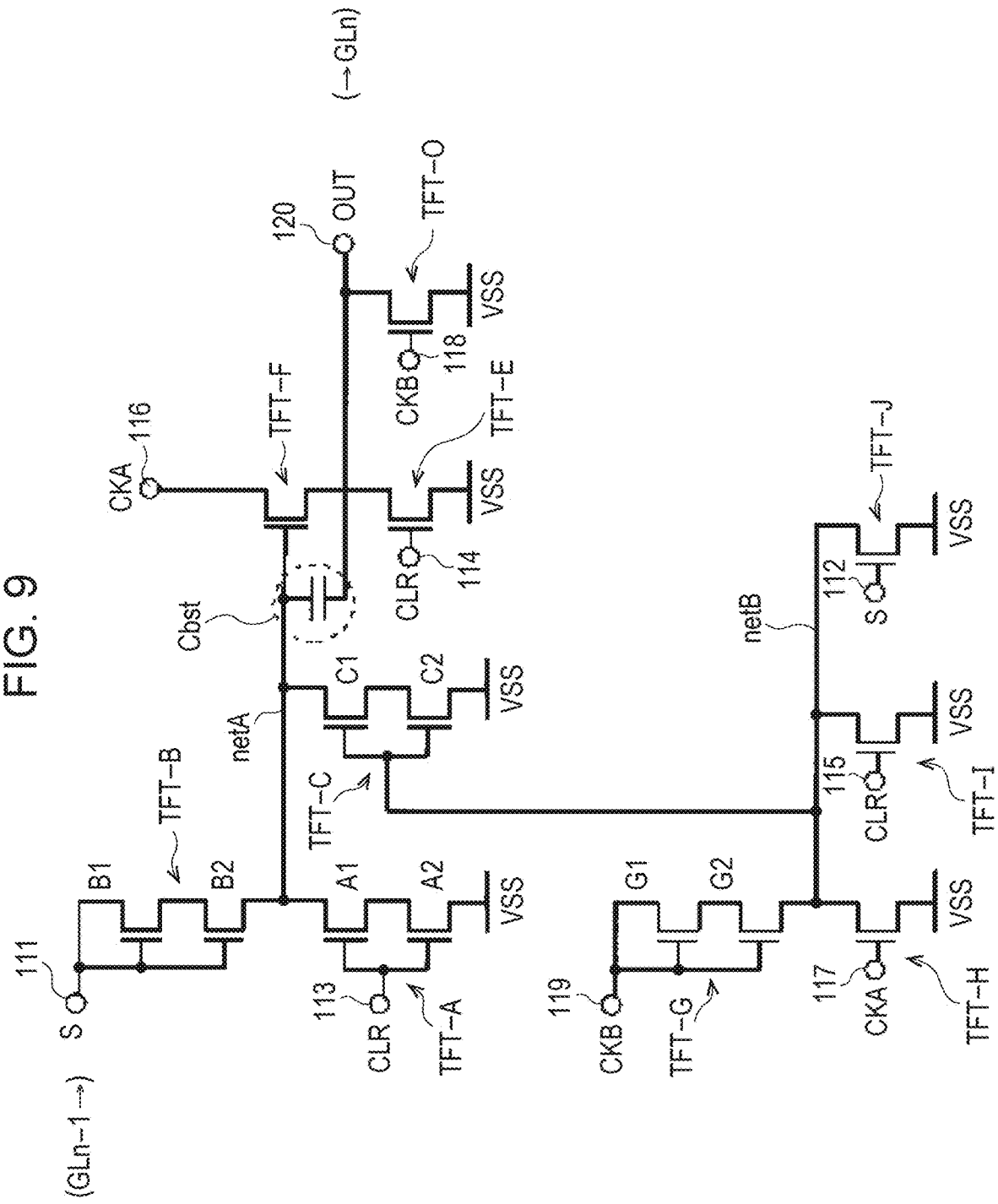
FIG. 9 illustrates an example of an equivalent circuit of a gate driver that is one of gate drivers of the liquid crystal display device illustrated in FIG. 8 and that is disposed between two gate bus lines.

FIG. 9 illustrates an equivalent circuit of a gate driver 60 that is one of gate drivers of the liquid crystal display device 102 and that is disposed between two gate bus lines. The gate driver 60 includes terminals 111 to 120 and TFTs TFT-A to TFT-J. Terminals 111 and 112 receive a scan signal (a set signal S) applied to a previous gate bus line (GLn−1) (in a previous stage), and the terminal 120 outputs a scan signal (S) to be applied to the next-stage (subsequent stage) gate bus line (GLn). In addition, the terminals 113, 114, and 115 receive a reset signal CLR that is at H (High) level for a certain time period in each of vertical scanning periods. The terminals 116 and 117 receives a clock signal CKA. The terminals 118 and 119 receives a clock signal CKB.

The direction in which the plurality of gate bus lines are scanned may be, for example, from top to bottom or from bottom to top of the display area 2a illustrated in FIG. 8. As described above, the gate driver 60 illustrated in FIG. 9 is disposed between two gate bus lines, so that in the liquid crystal display device 102, the gate driver 60 is positioned between every two adjacent gate bus lines. The terminals to which the clock signal CKA and the clock signal CKB are input are reversed between adjacent gate drivers 60. That is, the gate drivers 60 are arranged such that the gate drivers 60 each including the terminals 116 and 117 to which the clock signal CKA is input and the terminals 118 and 119 to which the clock signal CKB is input and the gate drivers 60 each including the terminals 116 and 117 to which the clock signal CKB is input and the terminals 118 and 119 to which the clock signal CKA is input alternate.

Figure 10:
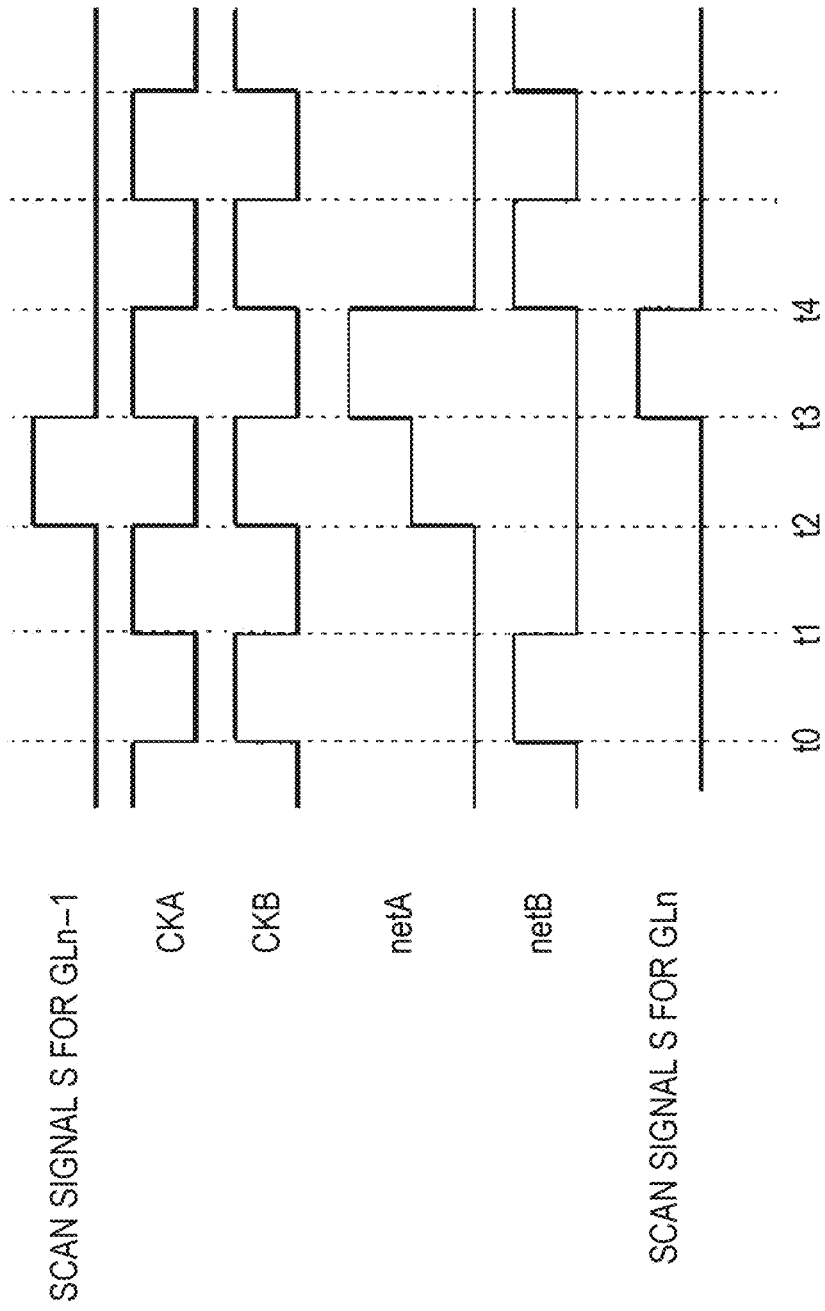
FIG. 10 illustrates the timing of signals input to the gate driver illustrated in FIG. 9.

FIG. 10 illustrates the timing of the signals. FIG. 10 also illustrates the signals applied to lines netA and netB illustrated in FIG. 9. When the scan signal is input to the gate bus line of the previous stage, the gate driver 60 inputs the scan signal to the gate bus line of the subsequent stage at the next timing on the basis of the timing of the clock signal CKA and the clock signal CKB.

Figure 11:
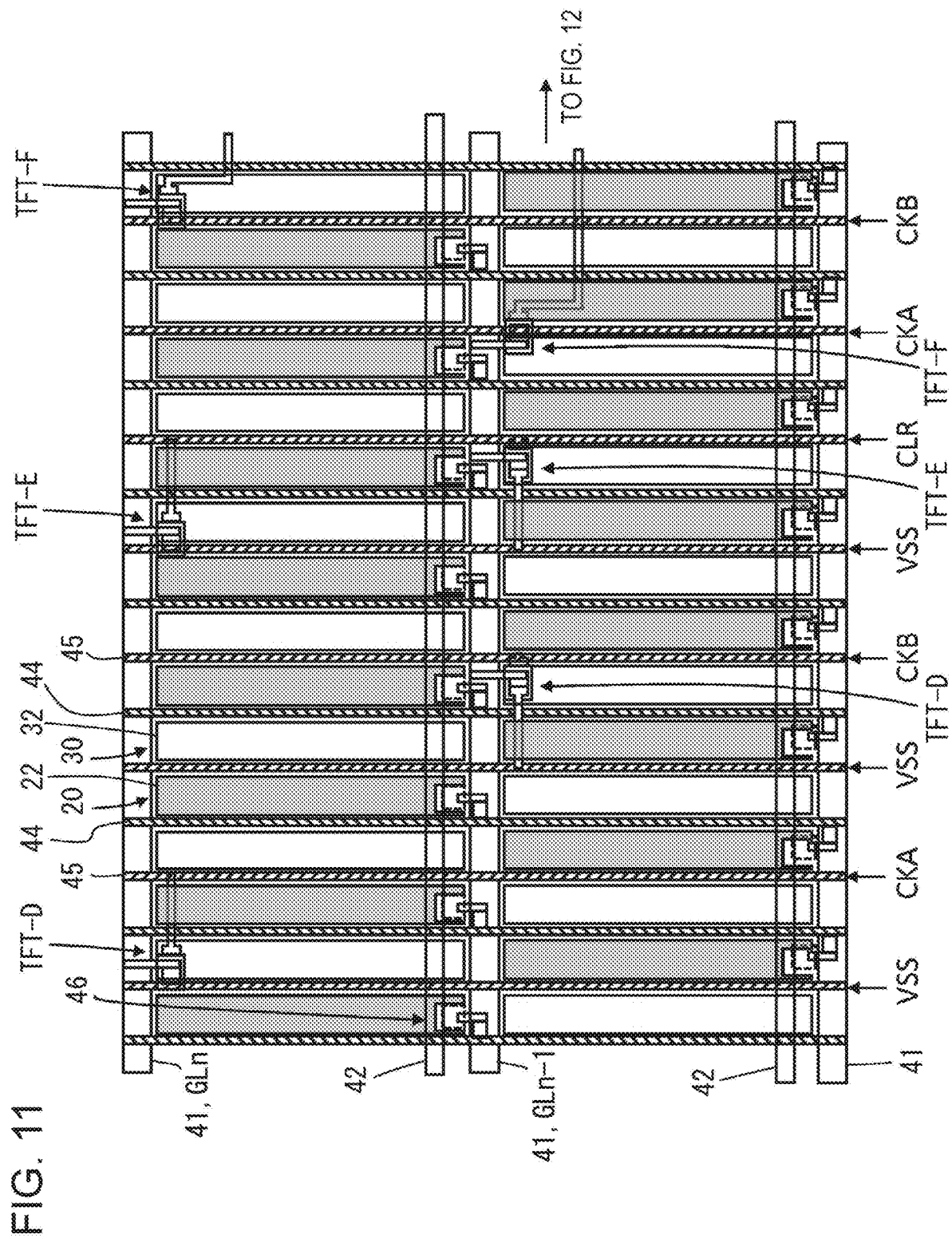
FIG. 11 is an enlarged schematic plan view of the configuration of the display area of the liquid crystal display device illustrated in FIG. 8.
Figure 12:
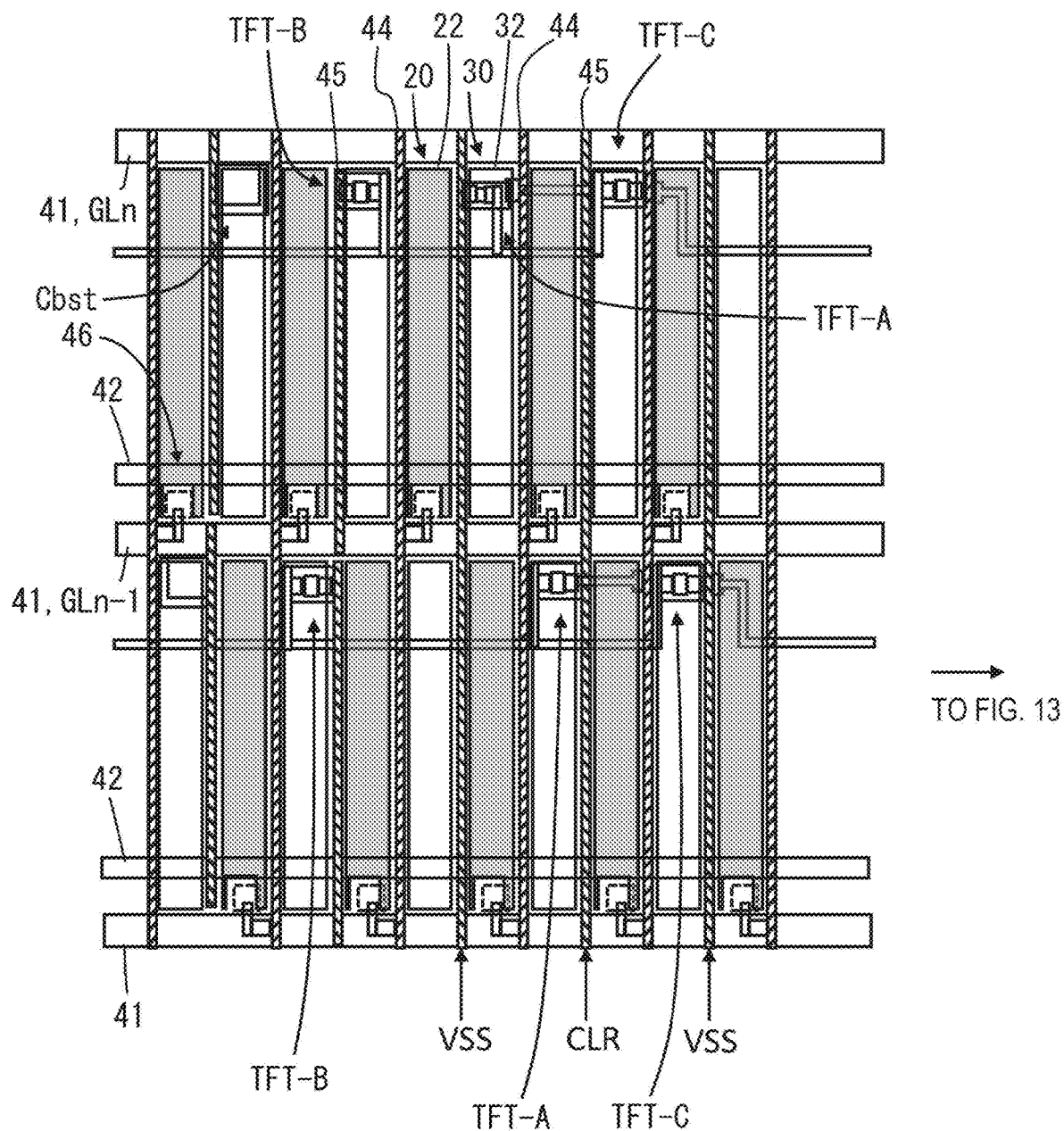
FIG. 12 is an enlarged schematic plan view of the configuration of the display area of the liquid crystal display device illustrated in FIG. 8.
Figure 13:
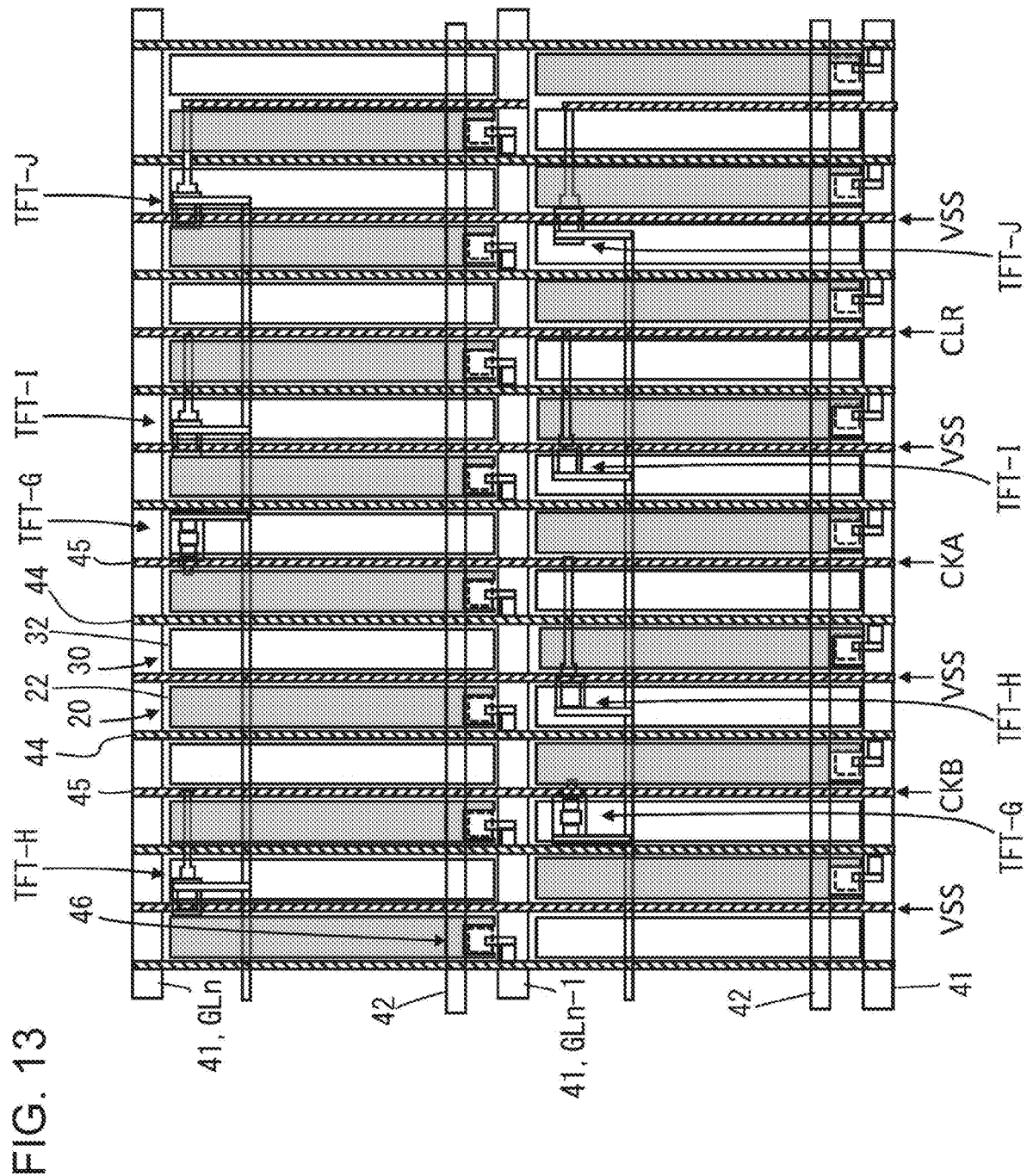
FIG. 13 is an enlarged schematic plan view of the configuration of the display area of the liquid crystal display device illustrated in FIG. 8.

FIGS. 11, 12 and 13 are enlarged schematic plan views of the configuration of the display area 2a of the liquid crystal display device 102. Like the first embodiment, the first areas 20 and the second areas 30 are arranged in a checkered pattern. The pixel electrode 22 and the first TFT 46 are located in the first area 20, and the first TFT 46 is connected to the gate bus line 41 and the source bus line 44. In contrast, in the second areas 30, the second TFTs TFT-A to TFT-J constituting the gate driver 60 are dispersedly arranged. A capacitor Cbst of the gate driver 60 illustrated in FIG. 9 is also disposed in the second area 30.

The TFTs TFT-A to TFT-J and capacitor Cbst are connected to one another by wire lines according to the equivalent circuit of FIG. 9 and are further connected to the dummy source bus line 45 and the gate bus line 41. At least a clock signal is supplied to the dummy source bus line 45 connected to the TFTs TFT-A to TFT-J. More specifically, as illustrated in FIGS. 11, 12, and 13, the above-described reset signal CLR, clock signal CKA, clock signal CKB, or a VSS signal, which is a potential for turning off the first TFT 46, is supplied. In this way, signals for driving the gate drivers 60 are supplied from the dummy source bus lines 45, and the gate bus lines 41 are sequentially scanned.

As described in the first embodiment, the liquid crystal display device 102 may further include the auxiliary capacitance line 42. In this case, the auxiliary capacitance lines 42 and the gate bus lines 41 are alternately arranged one by one in the column direction. In addition, the gate bus line 41 is connected to the transparent electrode 32 in the second area 30.

Figure 14:
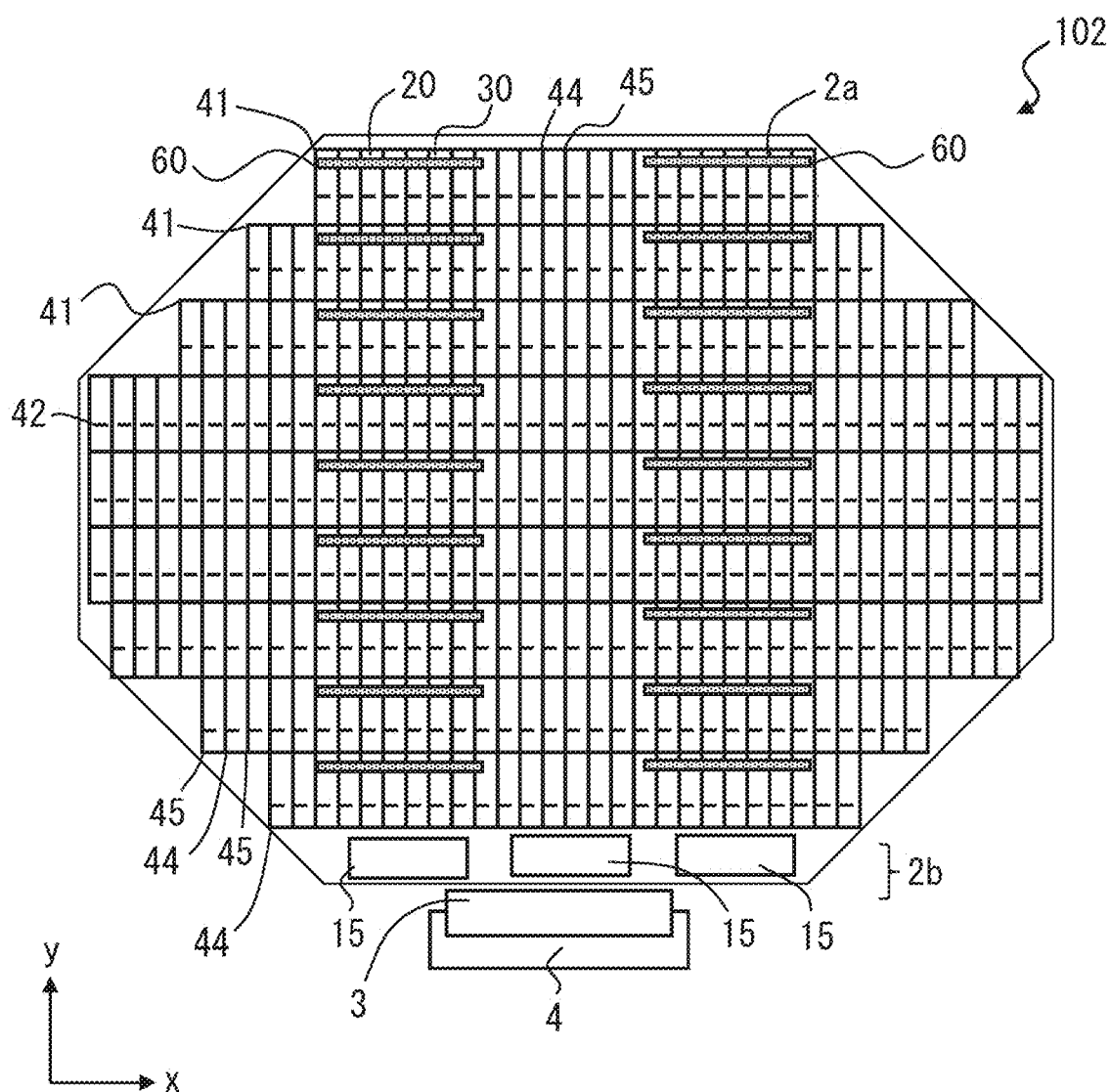
FIG. 14 is a schematic plan view of an example of arrangement of gate drivers in the liquid crystal display device illustrated in FIG. 8.

FIG. 14 is a schematic plan view of an example of the arrangement of the gate drivers 60 in the liquid crystal display device 102. In FIG. 14, a particular circuit configuration of the gate drivers 60 illustrated in FIGS. 11, 12, and 13 is schematically illustrated. Since the gate bus lines 41 extend in the row direction, one gate driver 60 can be disposed between every two adjacent gate bus lines 41. A plurality of gate drivers 60 may be disposed between two adjacent gate bus lines 41. FIG. 14 illustrates an example in which two gate drivers 60 are disposed between every two adjacent gate bus lines 41. When a plurality of gate drivers 60 are disposed between every two adjacent gate bus lines 41, it is desirable that two or more gate drivers 60 disposed between the same two adjacent gate bus lines 41 be driven synchronously. By arranging a plurality of gate drivers 60 between every two adjacent gate bus lines 41, delay of a scan signal applied to the gate bus line 41 can be reduced.

In addition, when the auxiliary capacitance line 42 is disposed, the dummy source bus line 45 not used for driving the gate driver 60 may be connected to the auxiliary capacitance line 42, as described in the first embodiment.

According to the liquid crystal display device 102 of the present embodiment, the gate driver 60 can be disposed in the display area 2a, and a signal for driving the gate driver 60 can be supplied by the dummy source bus line 45. Therefore, like the first embodiment, the non-display area located laterally to the display area of the liquid crystal display device can be reduced. In addition, in the liquid crystal display device according to the first embodiment, the gate driver 16 is disposed together with the source driver in the non-display area 2b located at one end in the column direction. In the liquid crystal display device 102 according to the present embodiment, the gate driver is disposed in the display area 2a. Therefore, the area of the non-display area 2b can also be reduced. As a result, according to the liquid crystal display device 102, a see-through display capable of increasing the freedom in designing the external appearance can be provided.

The liquid crystal display device according to the present disclosure can also be described as follows.

A liquid crystal display device according to a first configuration includes a first substrate, a second substrate disposed facing the first substrate, a liquid crystal layer located between the first substrate and the second substrate, where a display area is formed so as to be located in an area in which the first substrate, the second substrate, and the liquid crystal layer are stacked and where the display area includes a plurality of first areas and a plurality of second areas arranged in a matrix in a row direction and a column direction, a plurality of first TFTs each located in one of the plurality of first areas of the first substrate, a plurality of pixel electrodes each located in one of the plurality of first areas of the first substrate and connected to one of the plurality of first TFTs, a plurality of transparent electrodes each located in one of the plurality of second areas of the first substrate, a counter electrode located on one of the first substrate and the second substrate so as to face the plurality of pixel electrodes and the plurality of transparent electrodes, a plurality of gate bus lines located on the first substrate, where the gate bus lines extend in the row direction and are connected to the plurality of first TFTs, a plurality of source bus lines located on the first substrate, where the source bus lines extend in the column direction and are connected to the plurality of first TFTs, and a plurality of dummy source bus lines located on the first substrate, where each of the dummy source bus lines extends in the column direction and is connected to one of the plurality of gate bus lines.

According to the first configuration, since the second areas in which no image is displayed are arranged in the display area, objects and scenery behind the liquid crystal display device can be easily viewed. In addition, since the gate bus lines are led out in the column direction by the dummy source bus lines, the non-display area located in the horizontal direction of the display area can be reduced or substantially removed, thus improving the external appearance of the liquid crystal display device and increasing the freedom in designing the external appearance.

According to a second configuration, the liquid crystal display device according to the first configuration may further include a gate driver connected to the dummy source bus lines and a source driver connected to the source bus lines. The first substrate may include a non-display area located around the display area and at one end of the source bus lines and the dummy source bus lines, and the source driver and the gate driver are located in the non-display area. According to the second configuration, since the gate driver is disposed in the same non-display area as the source driver, the non-display area located in the horizontal direction of the display area can be reduced or substantially removed, thus improving the external appearance of the liquid crystal display device and increasing the freedom in designing the external appearance.

According to a third configuration, a liquid crystal display device includes a first substrate having a principal surface, a second substrate disposed facing the principal surface of the first substrate, a liquid crystal layer provided between the first substrate and the second substrate, where a display area is formed so as to be located in an area in which the first substrate, the second substrate, and the liquid crystal layer are stacked and where the display area includes a plurality of first areas and a plurality of second areas arranged in a matrix in a row direction and a column direction, a plurality of first TFTs each located in one of the plurality of first areas of the first substrate, a plurality of pixel electrodes each located in one of the plurality of first areas of the first substrate and connected to one of the plurality of first TFTs, a plurality of transparent electrodes each located in one of the plurality of second areas of the first substrate, a counter electrode located on the first substrate or the second substrate so as to face the plurality of pixel electrodes and the plurality of transparent electrodes, a plurality of gate bus lines located on the first substrate, where the gate bus lines extend in the row direction and are connected to the plurality of first TFTs, a plurality of source bus lines located on the first substrate, where the source bus lines extend in the column direction and are connected to the plurality of first TFTs, a plurality of dummy source bus lines located on the first substrate, where the dummy source bus lines extend in the column direction, and a gate driver connected to the plurality of gate bus lines, where the gate driver includes a plurality of second TFTs. The plurality of second TFTs are located in the second areas of the first substrate and are connected to at least a subset of the dummy source bus lines.

According to the third configuration, since the second areas in which no image is displayed are arranged in the display area, objects and scenery behind the liquid crystal display device can be easily viewed. In addition, since the gate driver is disposed in the display area, the non-display area which is located in the horizontal direction of the display area and which includes the gate driver in existing liquid crystal display devices can be reduced or substantially removed, thus increasing the freedom in designing the external appearance. Furthermore, since the TFTs constituting the gate driver are located in the second areas, the aperture ratio of the first areas where the image is displayed can be increased.

According to a fourth configuration, the liquid crystal display device according to the third configuration may further include a source driver connected to the source bus lines. The first substrate may include a non-display area located around the display area and at one end of the plurality of source bus lines, and the source driver may be located in the non-display area. According to the fourth configuration, since the gate driver need not be disposed in the non-display area where the source driver is disposed, the non-display area can be reduced.

According to a fifth configuration, in the liquid crystal display device according to the third or fourth configuration, a clock signal may be supplied to the plurality of dummy source bus lines.

According to a sixth configuration, the liquid crystal display device according to any one of the first to fifth configurations may further include a plurality of auxiliary capacitance lines located on the first substrate. The auxiliary capacitance lines may extend in the row direction and may be connected to the plurality of transparent electrodes. Thus, the capacitance can be maintained using the auxiliary capacitance lines.

According to a seventh configuration, in the liquid crystal display device according to the sixth configuration, a gradation signal may be supplied to the plurality of source bus lines, and a common signal may be supplied to the plurality of auxiliary capacitance lines.

According to an eighth configuration, in the liquid crystal display device according any one of the first to seventh configuration, the plurality of first areas and the plurality of second areas may be arranged in a checkered pattern, and the first TFTs located in two adjacent columns of the first areas may be connected to the same source bus line.

According to a ninth configuration, in the liquid crystal display device according any one of the first to eighth configurations, the plurality of source bus lines and the plurality of dummy source bus lines may be alternately located in the row direction.

According to a tenth configuration, in the liquid crystal display device according any one of the first to ninth configurations, at least a subset of the auxiliary capacitance lines may be connected to a subset of the plurality of dummy source bus lines. Therefore, the width of the auxiliary capacitance line can be reduced and, thus, the aperture ratio of each of the first area and the second area can be further increased.

According to an eleventh configuration, in the liquid crystal display device according any one of the first to tenth configurations, the second areas need not include TFTs connected to the transparent electrodes.

According to a twelfth configuration, the liquid crystal display device according any one of the first to ninth configurations may be driven in a normally white mode. Since the liquid crystal display device is driven in the normally white mode, objects and scenery behind the liquid crystal display device can be easily viewed at all times.

According to a thirteenth configuration, the liquid crystal display device according any one of the first to ninth configurations may be driven in a normally black mode. Since the liquid crystal display device is driven in the normally black mode, objects and scenery behind the liquid crystal display device are unlikely to be easily viewed. For this reason, the liquid crystal display device can function as either a blind or a curtain.

The liquid crystal display devices according to the embodiments of the present disclosure is suitably used as display devices capable of enabling the background or the like thereof to be viewed, such as free form displays, store windows, vehicle windows, game machines, digital signages, and building windows.

The present disclosure contains subject matter related to that disclosed in Japanese Priority Patent Application JP 2022-049156 filed in the Japan Patent Office on Mar. 24, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a first substrate;
a second substrate disposed facing the first substrate;
a liquid crystal layer located between the first substrate and the second substrate, wherein a display area is formed so as to be located in an area in which the first substrate, the second substrate, and the liquid crystal layer are stacked, and wherein the display area includes a plurality of first areas and a plurality of second areas arranged in a matrix in a row direction and a column direction;
a plurality of first thin film transistors (TFTs) each located in one of the plurality of first areas of the first substrate;
a plurality of pixel electrodes each located in one of the plurality of first areas of the first substrate and connected to one of the plurality of first TFTs;
a plurality of transparent electrodes, each located in one of the plurality of second areas of the first substrate;
a counter electrode located on one of the first substrate and the second substrate so as to face the plurality of pixel electrodes and the plurality of transparent electrodes;
a plurality of gate bus lines located on the first substrate, wherein the plurality of gate bus lines extends in the row direction and is connected to the plurality of first TFTs;
a plurality of source bus lines located on the first substrate, wherein the plurality of source bus lines extends in the column direction and is connected to the plurality of first TFTs;
a plurality of dummy source bus lines located on the first substrate, wherein each of the plurality of dummy source bus lines extends in the column direction and is connected to one of the plurality of gate bus lines;
a gate driver connected to the plurality of dummy source bus lines; and
a source driver connected to the plurality of source bus lines,
wherein the first substrate includes a non-display area located around the display area and at one end of the plurality of source bus lines and the plurality of dummy source bus lines, and
wherein the source driver and the gate driver are located in the non-display area.

2. The liquid crystal display device according to claim 1, further comprising:
a plurality of auxiliary capacitance lines located on the first substrate,
wherein the plurality of auxiliary capacitance lines extends in the row direction, and
wherein the plurality of auxiliary capacitance lines is connected to the plurality of transparent electrodes.

3. The liquid crystal display device according to claim 2, wherein a gradation signal is supplied to the plurality of source bus lines, and
wherein a common signal is supplied to the plurality of auxiliary capacitance lines.

4. The liquid crystal display device according to claim 2, wherein at least a subset of the plurality of auxiliary capacitance lines is connected to a subset of the plurality of dummy source bus lines.

5. The liquid crystal display device according to claim 1, wherein the plurality of first areas and the plurality of second areas are arranged in a checkered pattern, and
wherein the plurality of first TFTs located in two adjacent columns of the plurality of first areas are connected to a same source bus line.

6. The liquid crystal display device according to claim 1, wherein the plurality of source bus lines and the plurality of dummy source bus lines are alternately located in the row direction.

7. The liquid crystal display device according to claim 1, wherein the plurality of second areas does not include TFTs of the plurality of first TFTs connected to the plurality of transparent electrodes.

8. The liquid crystal display device according to claim 1, wherein the liquid crystal display device is driven in a normally white mode.

9. The liquid crystal display device according to claim 1, wherein the liquid crystal display device is driven in a normally black mode.

* * * * *